United States Patent [19]

Chamberlin et al.

[11] Patent Number: 5,676,484

[45] Date of Patent: Oct. 14, 1997

[54] CONNECTOR WITH INSERT MOLDED CAPTIVE BALL

[75] Inventors: James B. Chamberlin, Charlotte, N.C.; David Laws, Provo, Utah

[73] Assignee: AVM, Inc., Marion, S.C.

[21] Appl. No.: 780,713

[22] Filed: Jan. 8, 1997

Related U.S. Application Data

[63] Continuation of Ser. No. 698,274, Aug. 14, 1996, abandoned, which is a continuation of Ser. No. 445,495, May 22, 1995, abandoned.

[51] Int. Cl.$^6$ .......................................... F16C 11/06
[52] U.S. Cl. ............................ 403/122; 403/76; 264/242; 29/898.05
[58] Field of Search ............................. 403/122, 123, 403/119, 76, 77, 150; 264/242, 110, 130; 29/898.048, 898.049, 898.05

[56] References Cited

U.S. PATENT DOCUMENTS

| | | |
|---|---|---|
| 1,031,982 | 7/1912 | Caswell ............................ 403/122 X |
| 1,868,891 | 7/1932 | Faudi ............................... 403/122 |
| 3,158,528 | 11/1964 | Brown ........................... 264/110 X |
| 3,176,805 | 4/1965 | Gandy ........................... 403/150 X |
| 3,177,020 | 4/1965 | Dumpis ......................... 403/122 X |
| 3,438,661 | 4/1969 | Bowen, III .................. 29/898.048 X |
| 3,591,669 | 7/1971 | Membry ....................... 264/242 X |
| 4,708,839 | 11/1987 | Bellet et al. ................. 264/110 X |
| 5,407,288 | 4/1995 | Watanabe ...................... 403/133 |
| 5,409,320 | 4/1995 | Maury et al. ................ 403/122 X |

*Primary Examiner*—Anthony Knight
*Attorney, Agent, or Firm*—McAndrews, Held & Malloy, Ltd.

[57] ABSTRACT

A connector assembly with a connector body molded directly about a captive ball formed on a separate shaft, where the shaft and connector are attached to separate bodies which move relative to each other. This assembly retains an essentially zero clearance fit between the ball and the connector so as to prevent rattling between the parts from vibrations. This zero clearance fit is achieved at a much lower cost than comparable quality connectors due to higher diametric tolerances for the ball component. Higher diametric tolerances do not affect the final fit because the connector is molded directly about the ball.

11 Claims, 7 Drawing Sheets

CONNECTOR WITH INSERT MOLDED CAPTIVE BALL

This is a continuation of application Ser. No. 08/698,274, filed Aug. 14, 1996, now abandoned; which is a continuation of application Ser. No. 08/445,495 filed May 22, 1995, now abandoned.

TECHNICAL FIELD

The present invention relates generally to a connector assembly with a connector body molded directly about a captive ball formed on a separate shaft, where the shaft and connector are attached to separate bodies which move relative to each other. This assembly retains an essentially zero clearance fit between the ball and the connector so as to prevent rattling between the parts from vibrations. This zero clearance fit is achieved at a much lower cost than comparable quality connectors due to higher diametric tolerances for the ball component. Higher diametric tolerances do not affect the final fit because the connector is molded directly about the ball.

BACKGROUND

The present invention relates to captive ball and end connector assemblies, and more particularly, to captive ball and end connector assemblies having the connector body molded about the ball, and a method of fabricating the molded connector body.

Captive ball and end connector assemblies have been used for years in many applications. Such assemblies— comprised of a shaft with a ball at one end and an end connector with a socket for receiving the ball—are used to mechanically interconnect relatively movable parts. One particular use for such connectors is to mount the ends of gas springs on, for example, automotive hatch back doors and the adjacent parts of the automobile passenger compartment. Captive ball and end connector assemblies utilized in automotive applications, and especially in the passenger compartments of automobiles, need to be relatively noise free during the operation of the automobile. Assemblies that "rattle" are unacceptable.

Providing a connector assembly with an essentially zero clearance ball to socket fit insures that the connector parts will not rattle or become noisy, but also raises the cost of manufacturing the assemblies. For example, a tight diametric tolerance on the ball is often required to minimize the clearance between the ball and the cavity. Such balls, however, are relatively expensive to produce. Previously, those working in the art have been seeking a captive ball and end connector assembly that not only provides an essentially zero clearance fit but also has increased strength and can be produced at a relatively inexpensive cost.

SUMMARY OF THE INVENTION

Accordingly, it is an object of the present invention to provide a captive ball and end connector assembly that can be manufactured, at a competitive cost, to provide a ball to socket fit with essentially zero clearance.

Another object of the invention is to provide a captive ball and end connector assembly that allows a larger diametric tolerance on the ball while still achieving an essentially zero clearance fit.

Another object of the invention is to provide a captive ball and end connector assembly that has increased strength.

A further object of the invention is to provide a noise free captive ball and end connector assembly that is well suited for automotive applications.

A still further object of the invention is to provide a captive ball and end connector assembly that is easily molded.

These and other objects and advantages of the present invention will become apparent from the following description of the preferred embodiment of the invention as illustrated by the accompanying drawings next described.

DETAILED DESCRIPTION OF THE PREFERRED EMBODIMENT

Figure 1:
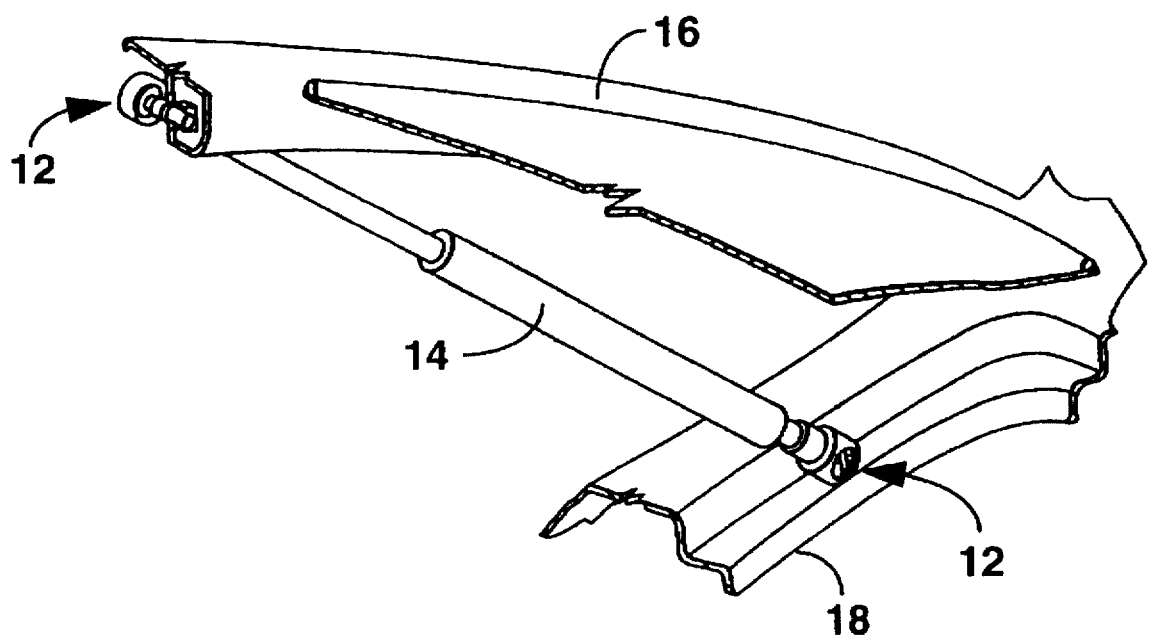
FIG. 1 is a partial perspective view showing improved captive ball and end connector assemblies of the present invention utilized to mount the ends of a gas spring between an automotive hatch back door and the adjacent part of the passenger compartment of the automobile.
Figure 2:
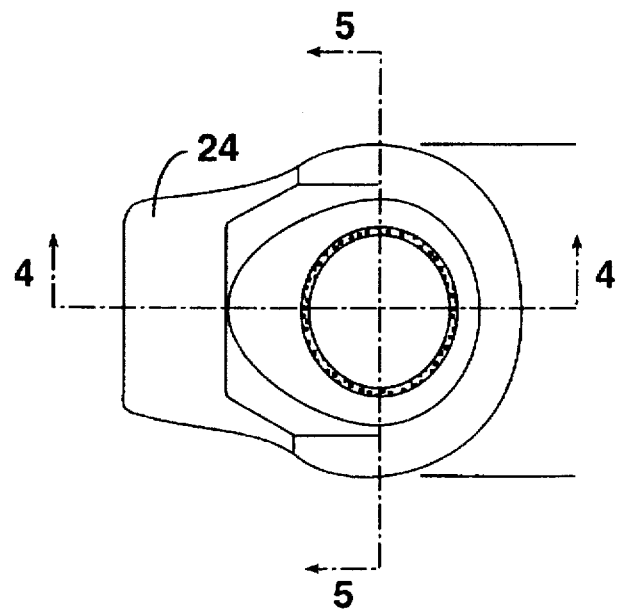
FIG. 2 is a top view of the end connector of an embodiment of the present invention.

Referring now to FIG. 1, two captive ball end connector assemblies, generally designated as 12, are used to mount the ends of a conventional gas spring 14 to a hatch back door 16 and to an adjacent part 18 of the passenger compartment of an automobile. This usage of these assemblies 12 permits relative movement to occur between the gas spring 14 and the door 16 and between the gas spring 14 and the part 18 as the door is opened and closed.

Figure 4:
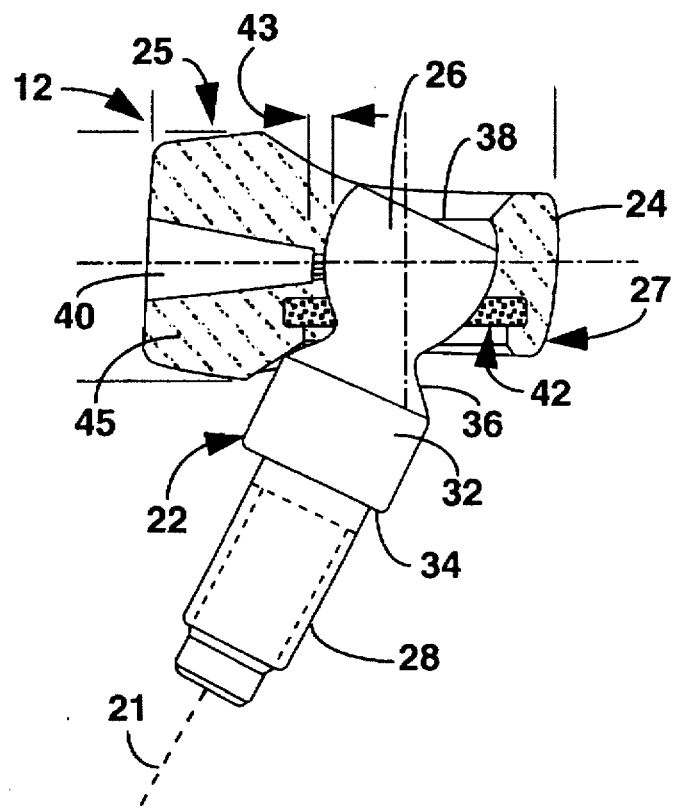
FIG. 4 is a vertical cross-sectional view taken along the line 4—4 of the assembly of FIG. 2 showing the captive balled shaft molded within the end connector cavity.
Figure 5:
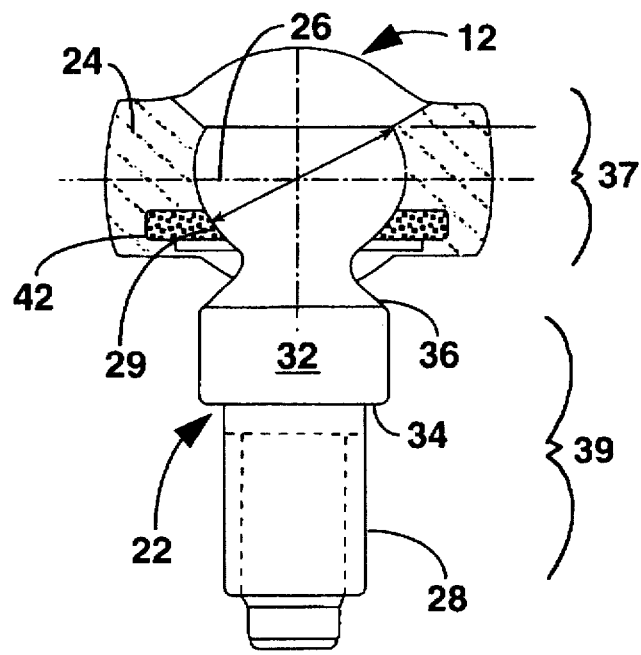
FIG. 5 is a vertical cross-sectional view taken along the line 5—5 in FIG. 2.
Figure 6:
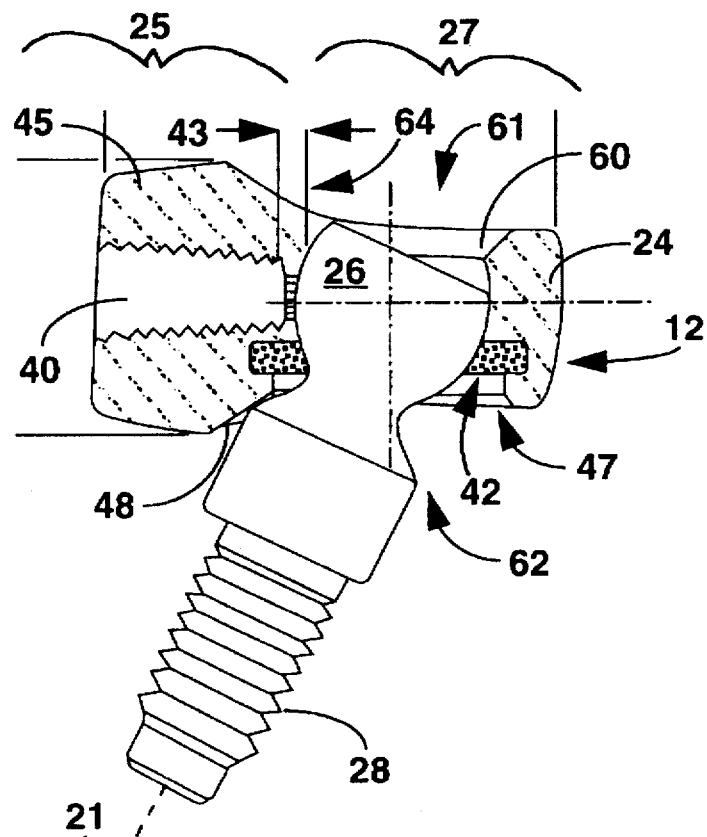
FIG. 6 is a vertical cross-sectional view (similar to FIG. 4) of another embodiment of the assembly of the present invention showing a threaded shaft and threaded end connector.

Referring now to FIGS. 4-6, the captive ball and end connector assembly 12 includes a shaft 22 and a connector body 24. The end connector 24 is molded from a fibre or mica platelet reinforced plastic material, such as a 30% glass filled nylon. The shaft 22 is formed from metal and has a first end 37 and a second end 39 (FIG. 5). A generally spherical ball 26, with a diameter 29, is positioned at the first end 37 of the shaft 22, while the other end 28 is threaded. The shaft 22 has a central portion 32 that is generally cylindrical in shape and includes a shoulder 34 adjacent to the threaded end 28. An inwardly and upwardly sloped neck portion 36 extends between ball 26 and the central portion 32.

Figure 4A:
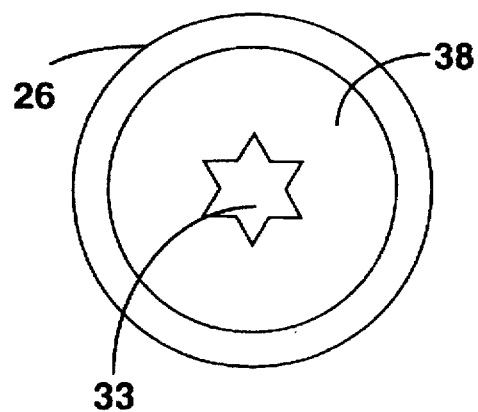
FIG. 4A is vertical view of the balled shaft.

As best shown in FIGS. 4, 4A, and 5, the ball 26 is not completely spherical in shape. The distal end of the ball 26 terminates in a flat end surface 38, the plane of which is generally perpendicular to the central longitudinal axis 21 of the shaft 22. The end surface 38 includes a recess 33 that is adapted to be engaged by a tool (not shown), so that turning the tool causes the shaft 22 to be rotated about its central longitudinal axis 21. This facilitates the threading of the threaded end 28 into or out of a cooperating component threaded for mounting the fitting.

Referring to FIGS. 4, 4A, 5, and 7, the end connector 24 includes a proximal end 27 for mounting the ball 26, and an enlarged distal end 25. A metal retaining washer 42 is also used in the assembly 12. This washer 42 encompasses a portion of the spherical surface of the ball 26 so as to provide added support for the mounted ball 26. The retaining washer 42 might be fabricated from brass, bronze, steel, or sintered material. The assembly 12 is formed by molding the connector body 24 around the metal ball 26 and washer 42 which are inserted into a connector body mold (not shown) before injection of the plastic connector body material. The molding process can include spraying the ball 26 with a teflon/rust-preventing agent to increase the ease of relative movement of the ball 26 within the connector body 24.

By molding the connector 24 about the ball 26 (and retaining washer 42), a zero clearance fit can be easily achieved and at a lower overall production cost than for other quality connectors. Normally, quality connectors need a ball diameter total tolerance of plus or minus one and one half thousandth (0.0015) of an inch to achieve near zero clearance fit. The present invention's technique of molding the connector about the ball allows for a larger ball diameter tolerance of six thousandths (0.006) of an inch to achieve the zero clearance fit. Because the molded connector body is formed directly about the ball 26 (and washer 42), essentially zero clearance is achieved between the ball and the ball cavity regardless of the relatively large tolerance on the diameter of the ball portion 26 of the shaft 22. Such larger ball tolerance results in lower production costs for the ball and shaft component 22. Moreover, a zero clearance fit eliminates the problems that accompany connectors having large clearances between the ball and the adjacent ball bearing surface of the connector body.

The distal end 25 of connector 24 forms a connector shank 45 which includes a frustoconical cavity 40, approximately 6 millimeters in diameter. The cavity 40 has a proximal and a distal end. The cavity 40 opening originates at the center of the most distal end of connector 24 and extends proximally forward to just before the captured ball 26. Hence, a relatively thin layer of material 43 (e.g. thin in relation to the thickness of the walls of the cavity 40 and the connector 24) remains between the most proximal end of cavity 40 and the ball 26.

Figure 7:
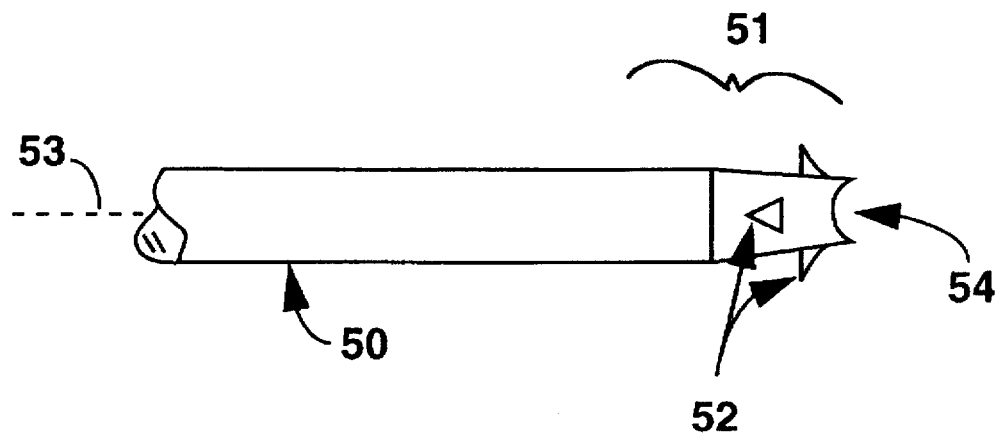
FIG. 7 is a perspective view of the end of a piston rod with barbs for mounting in the end connector.

Referring now to FIGS. 4 and 7, the end connector cavity 40 receives the mounting end 51 of a piston rod 50 of the gas spring 14 (FIG. 1). Piston rod 50 is typically made from metal such as drawn steel rod and includes a plurality of barbs 52 projecting outward on its mounting end 51. Piston rod 50 also includes a concave end surface 54 which lies in a plane perpendicular to the longitudinal axis 53 of rod 50. Piston rod 50 might be sonically welded, into cavity 40 of end connector 24. The outwardly projecting barbs 52 facilitate a secure connection by providing a gripping surface onto which the very viscous material, formed by the welding process, could solidify.

Figure 8:
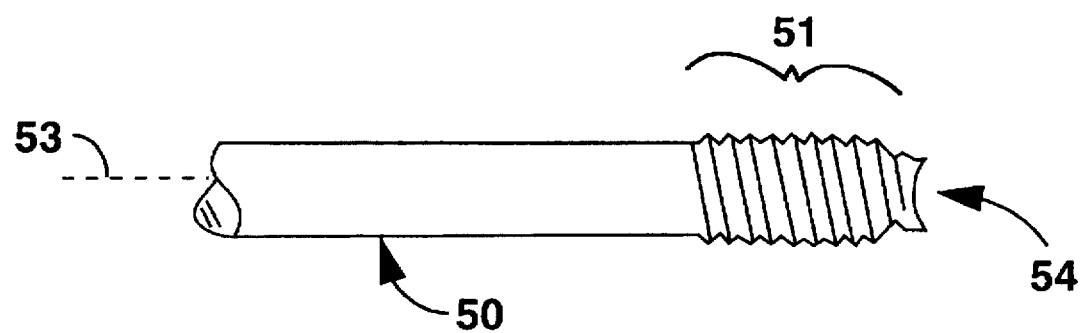
FIG. 8 is a perspective view of the end of a piston rod with threads for mounting in the end connector.

Other means of attaching piston rod 50 to end connector 24 could also be used. Referring to FIGS. 6 and 8, another embodiment is shown with the frustoconical cavity 40 being threaded to receive a piston rod 50 which is similarly threaded at its mounting end 51. The rod 50 thus screws into the cavity 40 to attach the rod 50 to the connector 24. The application of an adhesive, such as an anaerobic, to the threads prior to assembly increases the strength of the threaded connection.

For automotive applications in particular, the majority of gas springs are designed so that the piston rod is constantly urged to move or extend outwardly from the high pressure, gas containing, cylinder. Thus with the connector attached to the end of the piston rod, and the ball shaft 22 attached to a third member, a connector body will experience a compressive or possibly a bending load—unless a zero load condition on the connector body is achieved.

A zero load condition on the connector body is promoted if the force vector of the rod 50 intersects the center of the ball 26 on shaft 22. A zero load condition is further facilitated by molding the connector body 24 to have a relative thin film of material 43 between the rod end 54 and the surface of the ball 26. The preferred embodiment uses a film layer of material 43 of approximately 0.010 inches. Layer 43 varies with the formation of each connector 24, but generally falls within the range of 0.010 to 0.020 inches.

A zero load condition is also facilitated by making the end surface 54 of rod 50 concave in shape. The concave end surface 54 has a spherical radius approximately equal to that which defines the surface of the spherical ball 26 plus the thickness of the layer 43.

The advantages of this thin film 43 are best realized by considering the effects of using a relatively thicker layer 43. If instead there is a sizable amount of material between the end of the rod 50 and the surface of the ball 26, several things might happen. First, the body material might cold flow due to pressure from the piston rod 50. Cold flow is where a plastic material deforms due to pressure. Cold flow is generally a function of the stress applied to the plastic material, plus several other factors including, for instance, temperature, material composition, material thickness, and the geometry of the material surrounding the stressed volume.

Minimization of cold flow is desirable. Deformation due to cold flow of material 43 might alter the extended and collapsed length of the spring 14 (FIG. 1). This may cause the material of connector body 24 to thereby have to transmit the resulting loads to the surface of the ball 26. Transmission of these loads could conceivably place high stress on the material of the connector body 24 and result in deformation of the material. Alternatively such stresses might loosen the fit of the connector 24 with the ball 26 and thereby induce rattling in the assembly 12. With a thin film, cold flow effects are minimized accordingly.

Second, the thin layer 43 allows the concave end 54 of rod 50 to more evenly spread compressive forces from the rod 50 over the thin plastic film surface 43. The thin plastic film 43 provides a conforming surface compatible with that of the ball 26. This in turn evenly spreads the compressive forces over the projected contact surface of the metal ball 26.

Figure 3:
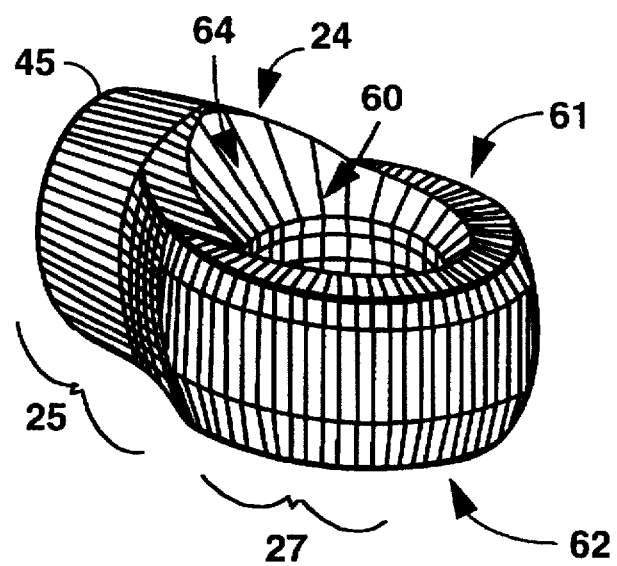
FIG. 3 is a perspective view of the end connector of the embodiment of FIG. 2.

The shape of end connector 24 also aids in its formation and use. Referring to FIG. 3, the end connector 24 includes a top surface 61 and a bottom surface 62. The top surface 61 includes a lip 60 which surrounds the cavity for encompassing the ball 26. The lip 60 is circular at the proximal end 27 of connector 24. The lip 60 has an outward flare 64, however, at the distal end 25 of connector 24, and the flare 64 extends outward towards the enlarged distal end 25 and the connector shank 45. This flaring provides a more gradual transition between the relatively thin section of the donut-shaped proximal end 27 and the relatively heavy section that forms the connector shank 45.

Referring now to FIG. 6, the bottom surface 62 of connector 24 has a similar circular lip 42 surrounding the cavity for encompassing the ball 26. A flare 48 also extends outwards towards the connector shank 45 to provide a more gradual transition between the distal end 25 and the proximal end 27. Artisans of molding generally disfavor abrupt changes between molded sections because such changes can lead to problems in gating the mold, and might also create shrinkage problems in the molded part. Therefore, the gradual changes in shape of connector 24 aid in its formation and usability.

Figure 9:
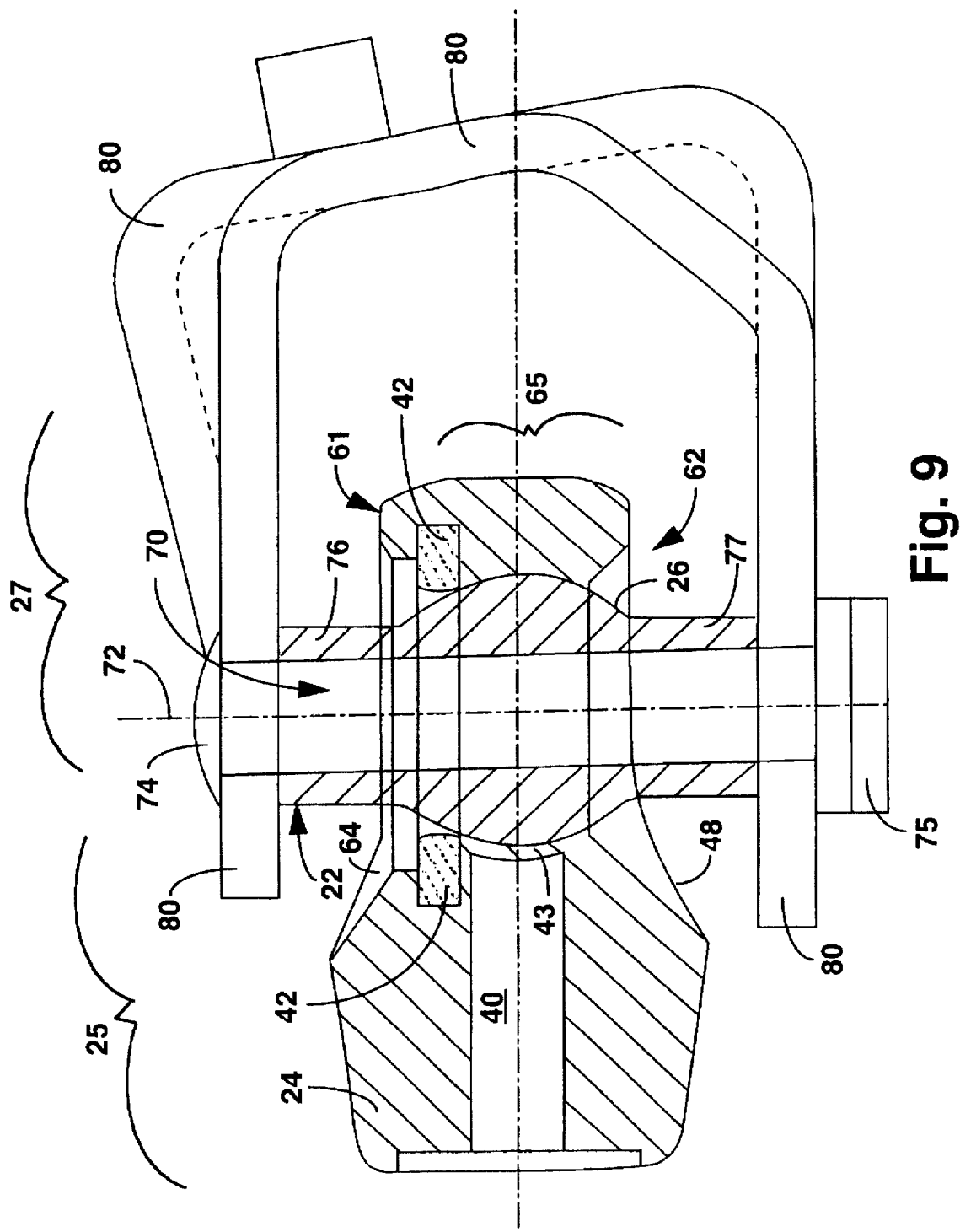
FIG. 9 is a cross-sectional view (similar to FIG. 4) of yet another embodiment of the present invention showing a balled shaft assembly with a shaft extending through a special ball and a molded counter bore to accept a threaded or barbed shaft.
Figure 10:
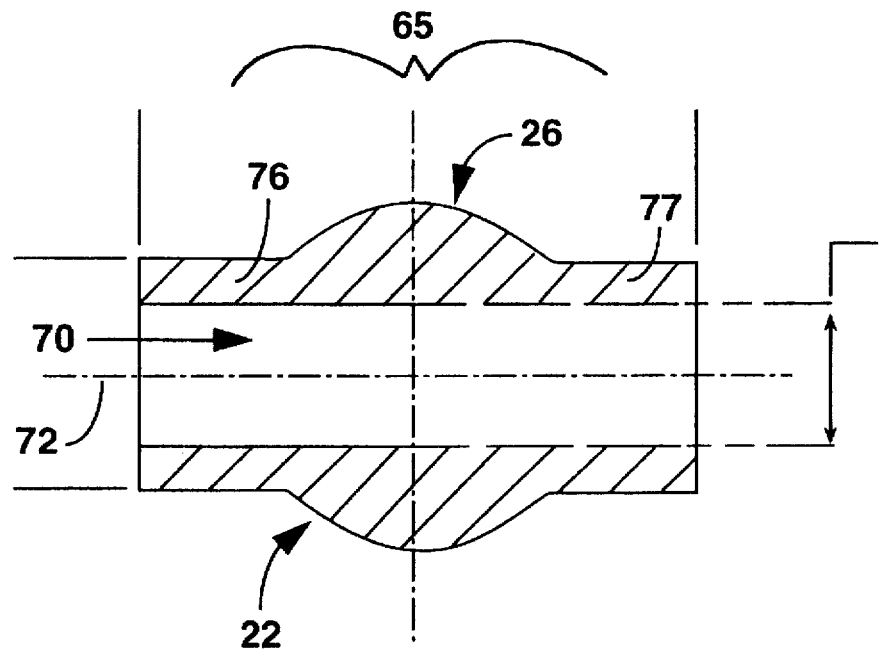
FIG. 10 is an isolated cross-section view of the balled shaft component of FIG. 9.
Figure 11:
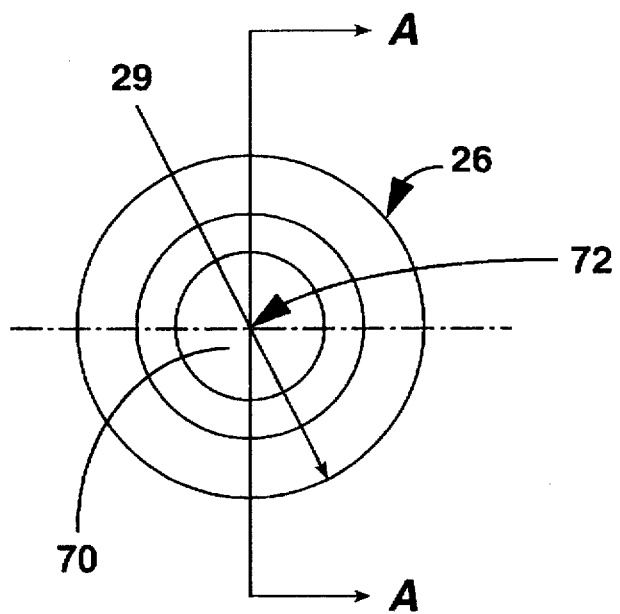
FIG. 11 is an isolated end view of the balled shaft component of FIG. 9.

Referring now to FIGS. 9–11, an alternative embodiment is shown with a ball 26 centered in the middle portion 65 of a shaft 22. The ball 26 has a substantially spherical surface. The shaft 22 includes shaft ends 76 and 77 which extend outwards from said middle portion 65 along the longitudinal axis 72 of said shaft 22. The shaft ends 76 and 77 extends outward from both the top surface 61 and the bottom surface 62 of the connector body 24 when the shaft 22 is molded into the connector body 24 with the retaining washer 42. The shaft 22 includes a hollow cavity 70 extending throughout the shaft 22 along its longitudinal axis 72. This cavity receives an attachment means, such as threaded bolt 74 and an accompanying nut 75 or rivet, for attaching a bracket 80 or similar support member to either side of shaft 22.

End connector 24 is attached to a piston rod 50 (FIGS. 7 and 8) as described previously. The cavity 40 in the distal end 25 of end connector 24 also extends proximally forward with a thin layer 43 remaining between the cavity 40 and the ball 26. By attaching the bracket 80 (which is subsequently attached to a third member, such as a car body) to both sides of the shaft 22, any forces are applied more evenly to both sides of the shaft 22 and the spherical ball 26.

While only one preferred embodiment, and several alternative embodiments, of the invention have been described hereinabove, those of ordinary skill in the art will recognize that the embodiments may be modified and altered without departing from the central spirit and scope of the invention. Thus, the embodiments described hereinabove are to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. An improved captive ball and connector assembly adapted for use where the assembly will be subjected to rattle inducing vibrations, such as when utilized in the passenger compartments of automobiles, and any resulting rattling would pose a problem for customers and end users and where mass production of the assembly at minimal production costs is a key customer goal, the improved assembly comprising:

a shaft including a ball portion and a first reduced diameter neck portion that is adjacent to the ball portion, with the shaft having a longitudinal axis, with the ball portion having a radially outwardly facing, substantially spherical surface portion that is defined between a first plane, which is disposed at an angle with respect to the longitudinal axis of the shaft and which is adjacent to the first neck portion, and a second plane, which is disposed at a similar angle with respect to the longitudinal central axis of the shaft; and that has a diameter greater than the first neck portion;

an end connector subassembly comprising an attachment rod, which has a mounting end, and a one piece molded plastic connector body, with the connector body having a proximal end and a distal end to which the mounting end of the attachment rod is attached, with the proximal end of the connector body including a ball containing cavity molded about at least part of the spherical surface portion, with the ball containing cavity having a diameter substantially equal to the diameter of the spherical surface portion so that essentially a zero clearance fit is achieved between the ball containing cavity and the spherical surface portion thereby eliminating rattling between the spherical surface position and the ball containing cavity when the assembly is subject to vibration; and an annular retaining washer that is disposed about the shaft adjacent to the first neck portion, with the retaining washer having a first surface which is in surface to surface contact with a spherical zone of the spherical surface portion, adjacent to the first plane and about the longitudinal axis of the shaft, with the first surface of the retaining washer being held against the spherical surface portion while the connector body is being molded about the spherical surface portion and during use of the assembly, and with the retaining washer serving to form a seal with the spherical surface portion so as to prevent the flow of plastic between the spherical surface portion and the retaining washer during the molding of the connector body.

2. The improved assembly of claim 1 wherein the distal end of the connector body includes a rod cavity for receiving the mounting end of the attachment rod, with the rod cavity opening originating in the center of the most distal end of the connector body and extending proximally forward towards the ball cavity.

3. The improved assembly of claim 2 wherein the rod cavity includes a proximal end and; wherein a relatively thick layer of molded plastic material remains between the proximal end of the rod cavity and the ball portion.

4. The improved assembly of claim 3 wherein the mounting end of the attachment rod includes a plurality of barbs which protrude outwards for securely mounting the attachment rod into the rod cavity.

5. The improved assembly of claim 4 wherein the attachment rod mounting end terminates in a concave surface which faces the spherical surface portion; and wherein the concave surface has a spherical radius approximately equal to that of the spherical surface portion.

6. The improved assembly of claim 3 wherein the rod cavity is threaded; and wherein the mounting end of the attachment rod; is similarly threaded, for securely mounting the attachment rod into the rod cavity.

7. The improved assembly of claim 6 wherein the attachment rod mounting end terminates in a concave surface which is perpendicular to the longitudinal axis of the attachment rod; and wherein the concave surface has a spherical radius approximately equal to that of the spherical surface portion.

8. The assembly of claim 3 wherein the attachment rod has a longitudinal axis; wherein the mounting end of the attachment rod terminates in a concave surface which faces the spherical surface portion and wherein the concave surface has a spherical radius approximately equal to that of the spherical surface portion.

9. The improved assembly of claim 1 wherein the shaft has a first end adjacent to the first neck portion and a second end defined by the second plane; and wherein the second end defines a flat surface which includes a recess for receiving a tool for rotating the shaft about its longitudinal axis.

10. The improved assembly of claim 1 wherein the connector body further includes:

a top and bottom surface;

a circumferential lip on each of the top and bottom surfaces, with each lip surrounding the ball containing cavity, and with each lip flaring towards the distal end of the connector body to create a gradual transition between the distal end and the proximal end of the molded connector body.

11. The assembly of claim 1 wherein the shaft has a first end adjacent to the first neck portion; wherein the shaft has a second neck portion adjacent to the second plane; and wherein the shaft has a second end adjacent to the second neck portion.

* * * * *